US012592573B2

(12) United States Patent
Marotz et al.

(10) Patent No.: US 12,592,573 B2
(45) Date of Patent: Mar. 31, 2026

(54) HYBRID GENERATOR WITH DETACHABLE POWER UNIT AND PANEL INTEGRATION

(71) Applicant: Kohler Co., Kohler, WI (US)

(72) Inventors: Benjamin Marotz, Kohler, WI (US); Harrison Chiu, Grafton, WI (US)

(73) Assignee: Discovery Energy, LLC, Kohler, WI (US)

( * ) Notice: Subject to any disclaimer, the term of this patent is extended or adjusted under 35 U.S.C. 154(b) by 927 days.

(21) Appl. No.: 17/741,893

(22) Filed: May 11, 2022

(65) Prior Publication Data

US 2022/0376526 A1 Nov. 24, 2022

Related U.S. Application Data

(60) Provisional application No. 63/192,424, filed on May 24, 2021.

(51) Int. Cl.
*H02J 7/00* (2006.01)

(52) U.S. Cl.
CPC .......... *H02J 7/0042* (2013.01); *H02J 7/0048* (2020.01); *H02J 2207/20* (2020.01)

(58) Field of Classification Search
CPC .............................. H02J 7/0042; H02J 7/0048
See application file for complete search history.

(56) References Cited

U.S. PATENT DOCUMENTS

| | | |
|---|---|---|
| 4,743,715 A | 5/1988 | Gerbert-gaillard et al. |
| 6,118,257 A | 9/2000 | Biquez et al. |
| 6,121,566 A | 9/2000 | Biquez et al. |
| 6,531,790 B2 | 3/2003 | Panuce et al. |
| 6,791,211 B1 | 9/2004 | Flegel |
| 7,126,068 B2 | 10/2006 | Fillppenko |
| 7,142,950 B2 | 11/2006 | Rasmussen et al. |
| 7,248,490 B2 | 7/2007 | Olsen et al. |
| 7,388,299 B2 | 6/2008 | Blackman |
| 7,482,710 B2 | 1/2009 | Ichinose et al. |
| 7,667,341 B2 | 2/2010 | Serdynski et al. |
| 7,786,696 B2 | 8/2010 | Kim et al. |

(Continued)

FOREIGN PATENT DOCUMENTS

| | | |
|---|---|---|
| CA | 2959731 A1 | 9/2018 |
| CN | 201570457 U | 9/2010 |

(Continued)

OTHER PUBLICATIONS

"QO and Homeline Generator Ready Split Bus and Load Centers", Schneider Electric USA, available as early as Apr. 13, 2021, https://www.se.com/us/en/work/products/generator-ready/, 5 pages.

(Continued)

*Primary Examiner* — Robert Grant
(74) *Attorney, Agent, or Firm* — The Belles Group, P.C.

(57) ABSTRACT

A generator module includes a battery, a charging circuit, an electric power outlet, and an enclosure. The charging circuit is coupled to an output of a generator and configured to charge the battery. The electric power outlet is configured to provide an output from the battery, the generator, or a combination of the battery and the generator. The enclosure includes the battery, the charging circuit, and the electric power outlet such that the enclosure detachable from the generator.

19 Claims, 13 Drawing Sheets

(56) References Cited

U.S. PATENT DOCUMENTS

| | | | |
|---|---|---|---|
| 8,081,407 B2 | 12/2011 | Willieme et al. | |
| 8,514,551 B2 | 8/2013 | Cosley et al. | |
| 8,820,286 B2 | 9/2014 | Cole et al. | |
| 8,994,336 B2 | 3/2015 | Brotto et al. | |
| 9,419,473 B2 | 8/2016 | Tomassi et al. | |
| 9,692,254 B2 | 6/2017 | Tomassi | |
| 9,779,891 B1 | 10/2017 | Ashtekar et al. | |
| 9,905,388 B2 | 2/2018 | Edmonds | |
| 9,929,571 B1 | 3/2018 | Dao et al. | |
| 10,931,139 B1 | 2/2021 | Andrews et al. | |
| 11,207,986 B2 | 12/2021 | Robert | |
| 2009/0295169 A1 * | 12/2009 | Usselman | F02N 11/0862 |
| | | | 290/1 A |
| 2012/0193988 A1 | 8/2012 | Eschrich et al. | |
| 2016/0359362 A1 | 12/2016 | Martin | |
| 2018/0323641 A1 | 11/2018 | Lee et al. | |
| 2019/0103761 A1 | 4/2019 | Wyma | |
| 2019/0229580 A1 | 7/2019 | Edwards et al. | |

FOREIGN PATENT DOCUMENTS

| | | | |
|---|---|---|---|
| CN | 202260612 U | | 5/2012 |
| EP | 2830190 B1 | | 8/2019 |
| EP | 3613125 A1 | | 2/2020 |
| JP | 5383745 B2 | | 1/2014 |
| WO | 0021178 A1 | | 4/2000 |
| WO | 02065620 A1 | | 8/2002 |
| WO | 2020112618 A1 | | 6/2020 |

OTHER PUBLICATIONS

Cummins Onan, 2011, RV generator set, Hybrid Quiet Diesel™ Series, HQD 8/10 and 12/18, 8 pages.
Stephen Regenold, "Exclusive! Goal Zero Just Announced a Gas Generator", GearJunkie, Jan. 3, 2017, https://gearjunkie.com/technology/goal-zero-fuel-gas-generator, 9 pages.
Extended European Search Report from European Patent Application No. 22173751.3, dated Oct. 26, 2022, 10 pages.

* cited by examiner

S101

DETACH INVERTER MODULE
FROM GENERATOR SYSTEM

S103

ATTACH INVERTER MODULE
TO EXTERNAL CIRCUIT

S105

ACCESS MODE IN RESPONSE
TO ATTACHMENT

S107

PROVIDE POWER FROM INVERTER
MODULE TO EXTERNAL CIRCUIT

HYBRID GENERATOR WITH DETACHABLE POWER UNIT AND PANEL INTEGRATION

CROSS REFERENCE TO PRIOR APPLICATION

This application claims priority benefit of Provisional Application No. 63/192,424 filed May 24, 2021, the content of which is hereby incorporated by reference in its entirety.

FIELD

The present application relates generally to a hybrid generator with a detachable power unit and integration into a wall panel.

BACKGROUND

An engine-generator set, which may be referred to as a generator or a genset, may include an engine and an alternator or another device for generating electrical energy or power. One or more generators may provide electrical power to a load through a power bus. The power bus, which may be referred to as a generator bus or common bus, transfers the electrical power from the engine-generator set to a load. In many examples, the electrical load on the engine-generator set may vary over time and challenges remain in providing an efficient generator that can adapt to varying loads.

BRIEF DESCRIPTION OF THE DRAWINGS

Exemplary embodiments are described herein with reference to the following drawings, according to an exemplary embodiment.

DETAILED DESCRIPTION

The following embodiments include an engine-generator set, which may be referred to as a generator or a genset, and may include an engine and an alternator. The alternator of the genset is an example electric machine. The alternator may include permanent magnets for the exciter of the generator or the main generator or the exciter. The generator may include a wound rotor generator with a permanent magnet exciter, the electrical machine may also act as a motor as well. Other embodiments of electrical machines include permanent magnet brush-type direct current (DC) machines, permanent magnet brushless DC machines, series-wound or universal machines, induction alternating current (AC) machines, synchronous AC machines, synchronous reluctance machines, switched reluctance machines, among others. Any machine may be used as a motor, selectively between a motor and a generator, or entirely as a generator.

It should be noted that while engine is used as a term to describe the prime mover converting fuel to a rotational speed and torque applied to a generator, any apparatus capable of providing mechanical torque and rotation or of requiring mechanical torque and rotation may be coupled to an electrical machine, operating as a motor or a generator. An electrical machine may also provide torque without causing rotation, such as to hold a position against a load. Thus, rotation is not required to define a device as an electrical machine. Further, the engine maybe be configured for a constant speed or a variable speed that varies based on the load. Likewise, the alternator may be included in a variable speed generator.

Figure 1:
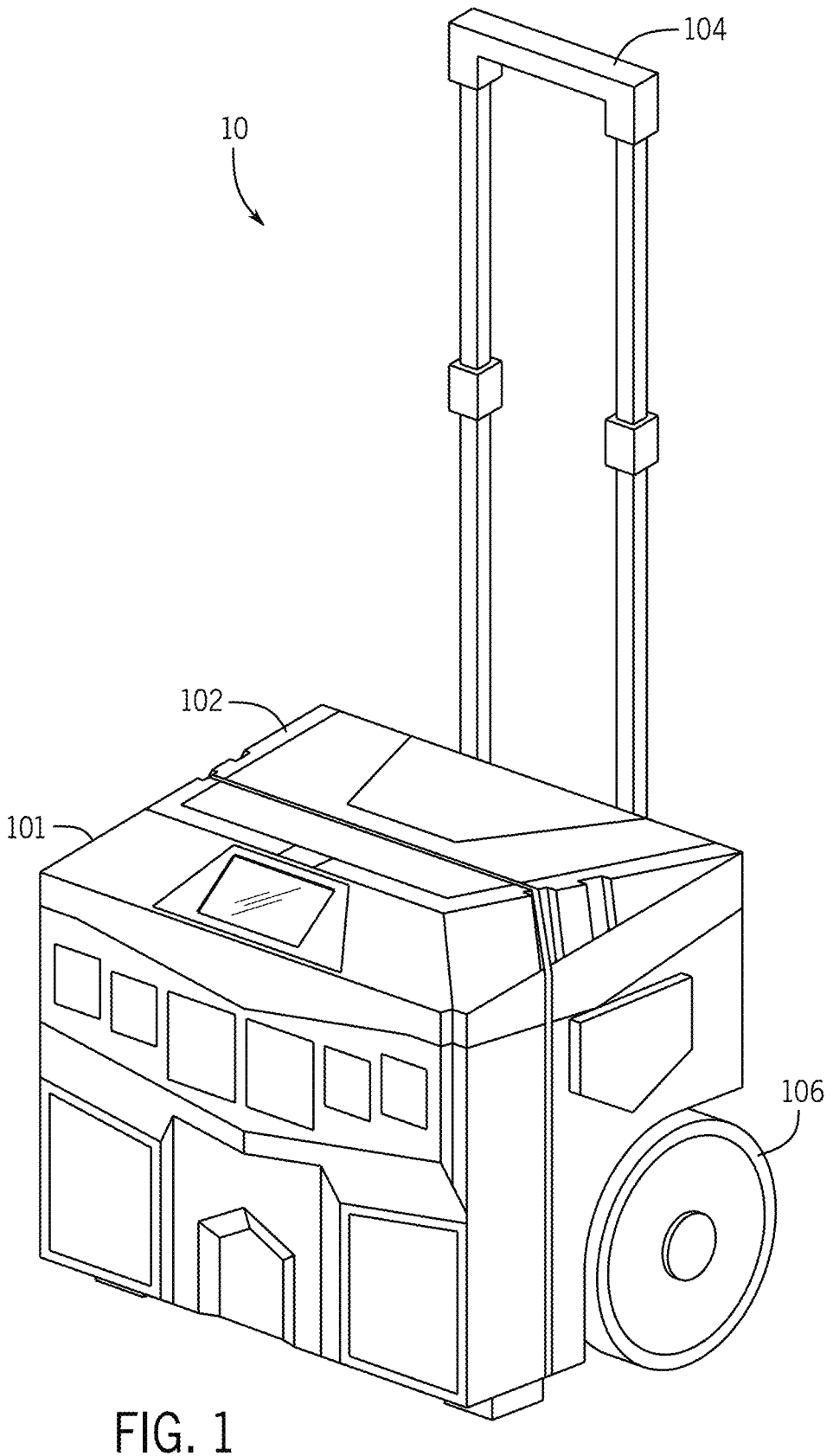
FIG. 1 illustrates an example portable generator.

FIG. 1 illustrates an example portable generator 10. The generator may be considered portable in that it is movable between various geographic locations. The generator may be transported via a truck or trailer. The generator may include a handle 104 and/or wheels 106. The user may move the generator by grasping the handle 104 and pulling or pushing the generator along a surface on the wheels.

The generator 10 may comprise modular components (e.g., generator modules) that are attachable and removable from each other. The generator 10 may include a first generator module (e.g., engine module 102) and a second generator module (e.g., inverter module 101). The engine module 102 may include the engine and one or more additional components such as a fuel system, an exhaust system, a starter system, a coolant system or others. The inverter module 101 may include at least an alternator and may also include a battery or other storage device, an output system, and one or more coupling mechanisms. Additional, different, or fewer components may be included.

Figure 2:
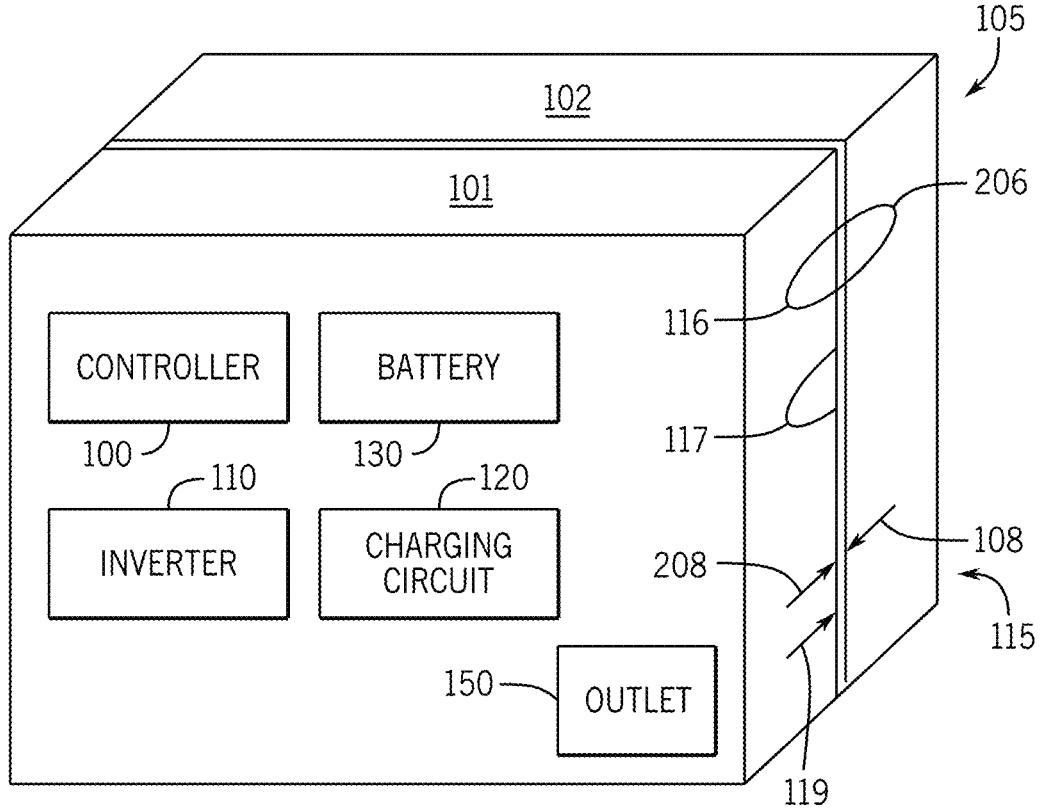
FIG. 2 illustrates an example portable generator having at least two separable generator modules.

FIG. 2 illustrates an example portable generator having at least two separable generator modules including inverter module 101 and the engine module 102.

The inverter module 101 may include a controller 100, an inverter circuit 110, a charging circuit 120, and at least one battery 130. The inverter module 101 may also include a coupling device including one or both of a mechanical coupling device 105 and an electrical coupling device 115. The inverter module 101 may include an enclosure or housing that supported and encloses the battery 130, the charging circuit, and the electric power outlet. The enclosure is detachable from the generator 10 as described herein. Additional, different, or fewer components may be included.

Figure 3:
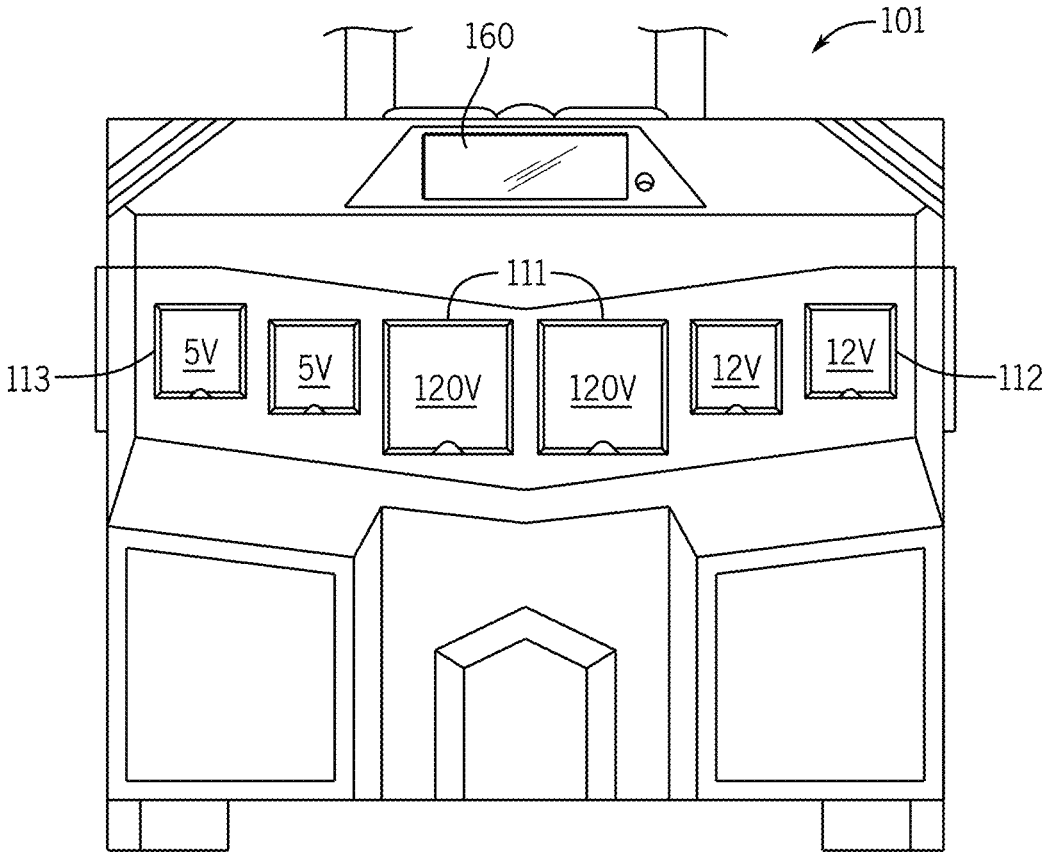
FIG. 3 illustrates an output module for the example portable generator.

The output of the inverter module 101 may include an outlet 150. As shown in FIG. 3, the output of for the example portable generator 10 may include multiple types of outlets (e.g., first outlets 111, second outlets 112, and third outlets 113). The outlets may have different shapes and sizes. The outlets may have different voltage ratings, current ratings, or other electrical parameters.

The inverter circuit 110 may be configured to convert electrical power stored in the battery 130 to an alternating current signal for the electric power outlet. The inverter circuit 110 is configured to change direct current (e.g., from the energy stored in the battery 130) to alternating current for the output. The output may be a square wave, modified sine wave, pulsed sine wave, pulse width modulated wave or sine wave depending on circuit design.

The inverter circuit 110 may include an H-bridge having multiple transistor switches and one or more antiparallel diodes. The H-bridge may include four transistors or four transistor-diode pairs.

The inverter module 101 may include a charging circuit coupled to an output of a generator and configured to charge the battery 130. The charging circuit may include an AC to DC converter. The charging circuit may include one or more diodes. The charging circuit may include a rectifier circuit, which may include four diodes and a smoothing capacitor.

The generator 10 may include a mechanical coupling device 105. One side (e.g., connector 116) of the mechanical coupling device 105 is on the inverter module 101 and the other side (e.g., connector 206) of the mechanical coupling device 105 is on the engine module 102. In addition, the wall mount may include a mechanical coupling device 105 configured to mate with another portion (e.g., connector 117) of the mechanical coupling device 105 of the inverter module 101.

The mechanical coupling device 105 may include a snap fit connection such as a tab and receiving hole. The tab is inserted into the receiving hole to secure the inverter module 101 to the engine module 102. A release mechanism (e.g., release button) may be depressed to remove the tab from the receiving hole and detach the inverter module 101 from the engine module 102. The mechanical coupling device 105 may include a first latch configured to secure the enclosure to the generator and a second latch configured to secure the enclosure to a mount. Other connections may include bolt and clevis pin, buckles, or other examples.

The mechanical coupling device 105 may align the inverter module 101 to the engine module 102 to attach and detach the generator and engine modules from each other in a first configuration. The mechanical coupling device 105 may align the inverter module 101 to the wall mount to attach and detach the inverter module 101 to an external circuit in a second configuration.

For example, different electrical connections may be made to the inverter module 101 depending on whether the inverter module 101 is in the first configuration or the second configuration. The generator 10 may include an electrical coupling device 115 including a generator output 108 on the engine module 102 side. On the inverter module 101 side, a first electrical contact 208 configured to connect the charging circuit to the alternator or the generator output 108 (e.g., via the charging circuit 120) and a second electrical contact 119 configured to connect the battery 130 to the external circuit.

The inverter module 101 may include an electric power outlet configured to provide an output from the battery 130, the generator, or a combination of the battery 130 and the generator. The controller 100 is configured to select a mode for the generator module. Example modes include a quiet mode, a maximum power mode, a no generator mode, and/or a hybrid mode. The controller 100 may select and cause the generator 10 to operate on a specific cycle.

In the quiet mode, the controller 100 may instruct the generator 10 (e.g., engine) only when the battery power has been depleted. Once, the battery power is no longer available, or below a predetermined threshold, the controller 100 instructs the generator 10 to resume operation. Thus, when possible, the generator 10 (e.g., engine) is not operated, which reduces noise when possible.

In the maximum power mode, the controller 100 may instruct the generator 10 (e.g., engine) to operate at all times, or any time there is a load on the generator.

In the no generator mode, the controller 100 may instruct the generator 10 (e.g., engine) to not operate. The engine may be turned off regardless of load and/or regardless of battery capacity.

Figure 4:
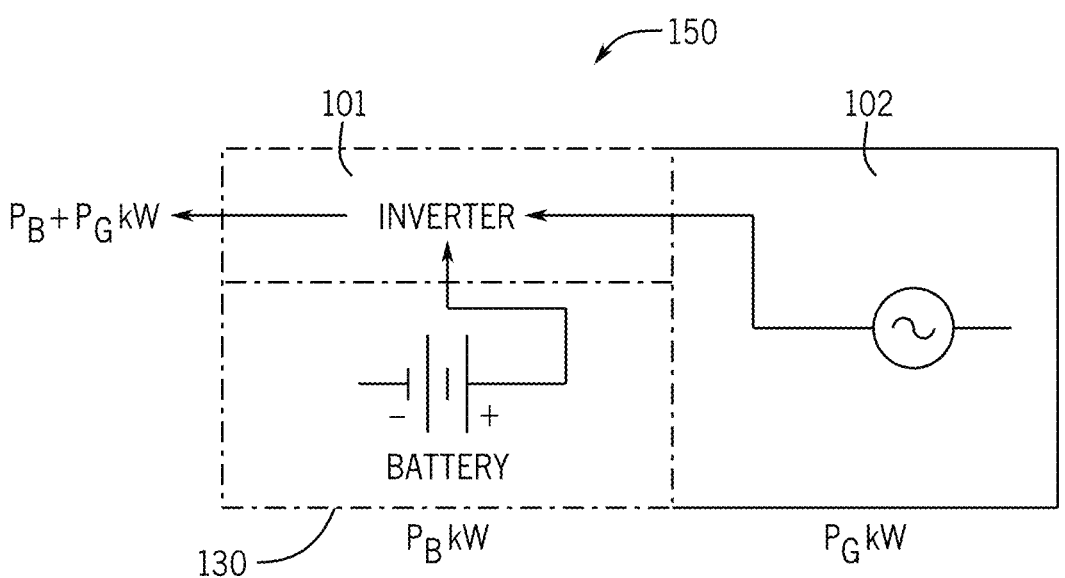
FIG. 4 illustrates a circuit to represent a hybrid mode of operation.

FIG. 4 illustrates a circuit 180 to represent a hybrid mode of operation. In the hybrid mode, the controller 100 may instruct the engine to operate when the load is above a predetermined level (e.g., during a predetermined load condition). The predetermined level may be greater than both the rated output of the generator 10 and the output of the battery 130. However, the predetermined level may be equal or less than the sum of the rated power of the generator 10 and the output of the battery 130. FIG. 4 illustrates circuit 180 to represent a hybrid mode of operation in which the output of the inverter module 101 includes the sum of the output of the generator 10 and the output of the battery 130.

Figure 5:
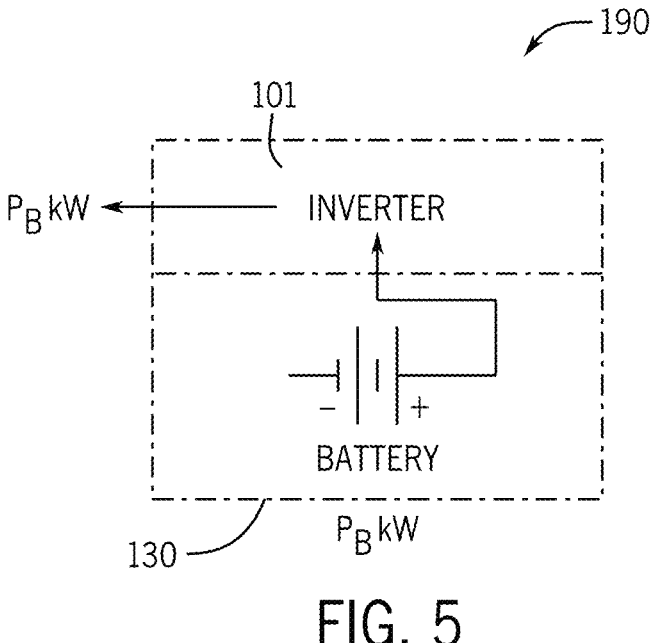
FIG. 5 illustrates a circuit to represent a remote mode of operation.

FIG. 5 illustrates a circuit 190 to represent a remote mode of operation. In a wall mount mode (e.g., remote mode) of operation, the controller 100 may instruct the generator 10 (e.g., engine) to not operate. The wall mount mode corresponds to when the inverter module 101 is connected to the wall, and not coupled to the engine module 102. The engine may be turned off regardless of load and/or regardless of battery capacity. Any available power is provided to the attached circuit from the battery 130. FIG. 5 illustrates circuit 190 to represent a remote mode of operation and illustrates that the output of the battery 130 is the same as the output of the inverter module 101.

In one example, the mode is determined by the controller 100 in response to sensor data. For example, a sensing circuit may generate sensor data indicative of the load on the generator. The load may be detected by measured electrical parameters at the output of the alternator. Example, electrical characteristics include power, current, and voltage. The load may be detected by measured electrical parameters at the field windings of the alternator. The amount of flux induced on the field coil by a current in the armature windings may be indicative of an output of the generator. Further, because a load on the generator impacts the current in the armature windings, the sensor data may be indicative of the load on the generator. The sensor data may be temperature data, which may indicate the resistance of the field coils or armature windings. The sensor data may be magnetic data measured on damper windings of the rotor, parallel or perpendicular to the primary rotor flux. The sensor data may describe a physical position of the rotor in any direction or a capacitance that is related to proximity to a surface, the sensor data may be acceleration data or strain data measured on the rotor, or the sensor data may be a deflection measurement on any axis or mode.

In one example, the mode is determined by the controller 100 in response to a user selection. That is, the user may provide input directly to the generator. One example is a user input device 160. The user input device 160 may include a display, a touchscreen, a keypad, a button, or other device for providing the user selection to the controller 100. The user input device 160 may include one or more indicators such as a batter level indicator configured to display the battery level or stored power in the inverter module 101.

In one example, the mode is determined by the controller 100 in response to a time or day (e.g., calendar). Certain modes may be assigned to certain times of days, days of the week, or days of the year. For example, the quiet mode may be assigned to overnight hours such as 10 P.M. to 6 A.M.

Figure 6:
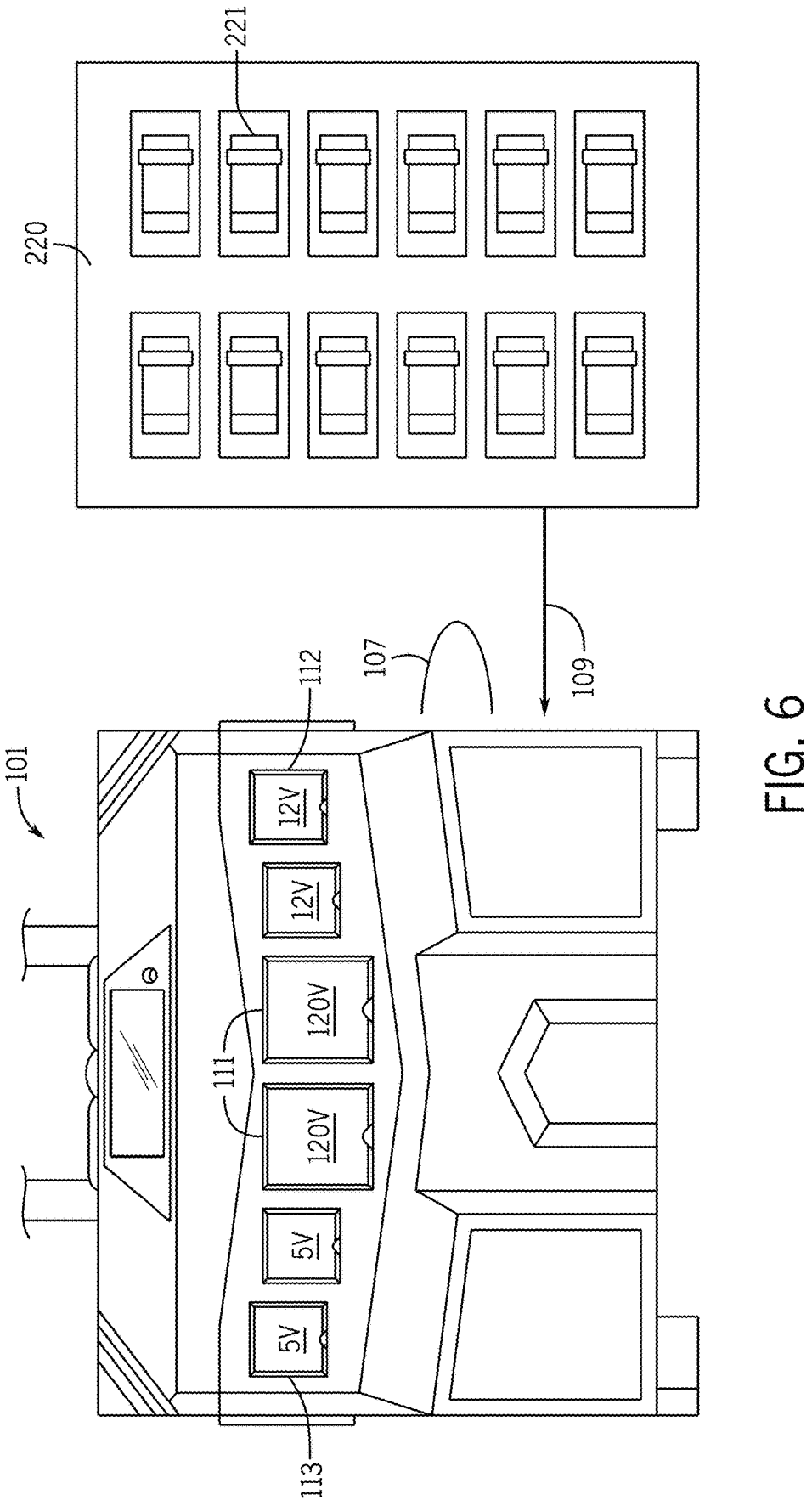
FIG. 6 illustrates an example wall mount for the output module.

FIG. 6 illustrates a wall mount for the output module. The wall mount includes a connector 107 for the mechanical coupling device 105 and an electrical connector 109 for the electrical coupling device 115. The connector 107 attaches the inverter module 101 to the wall mount and the electrical connector 109 provides an electrical path from the output of the inverter module 101 to an electrical panel 220 including one or more circuit breakers 221.

Figure 7:
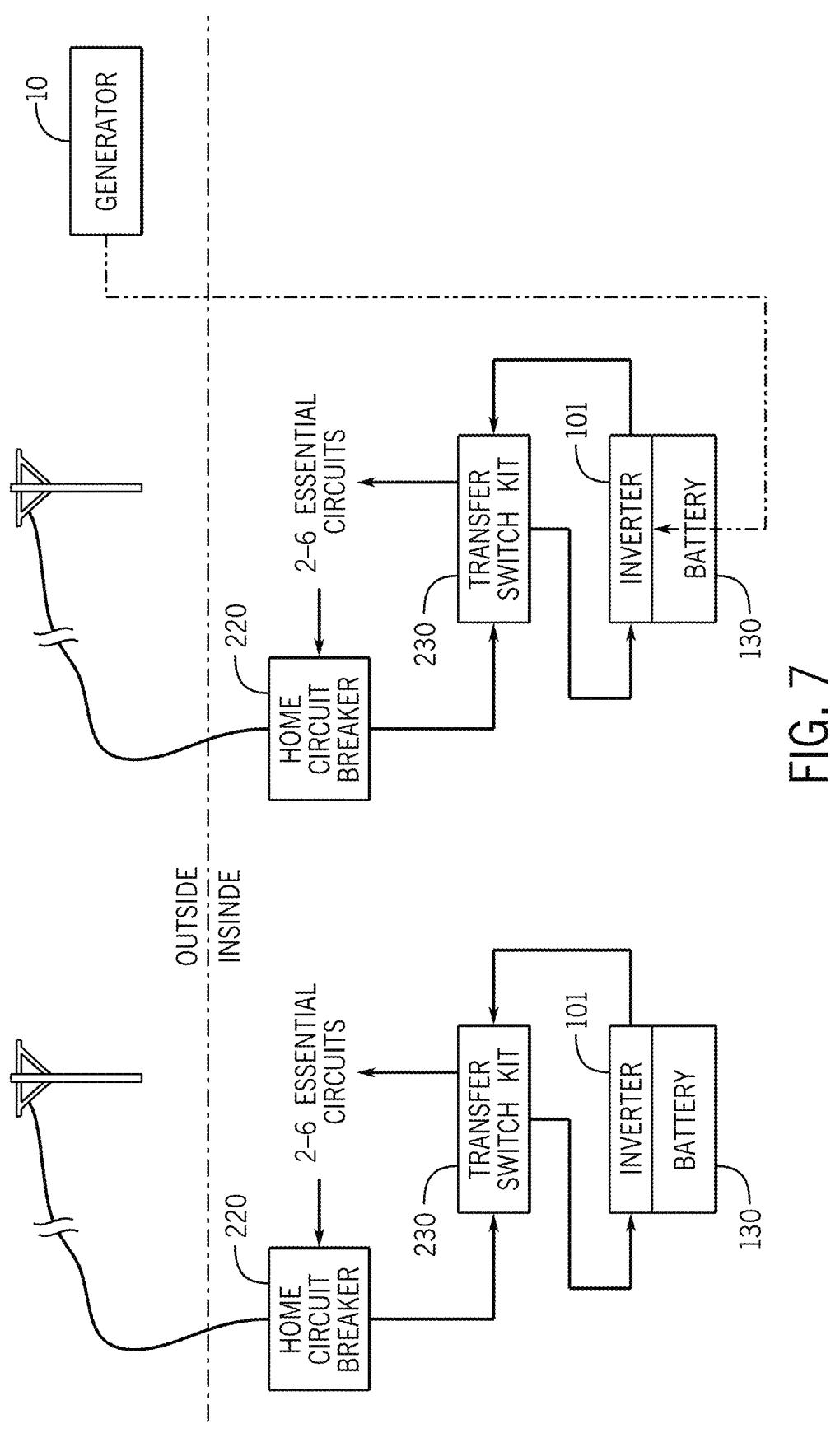
FIG. 7 illustrates an example home layout for the portable generator.
Figure 8:
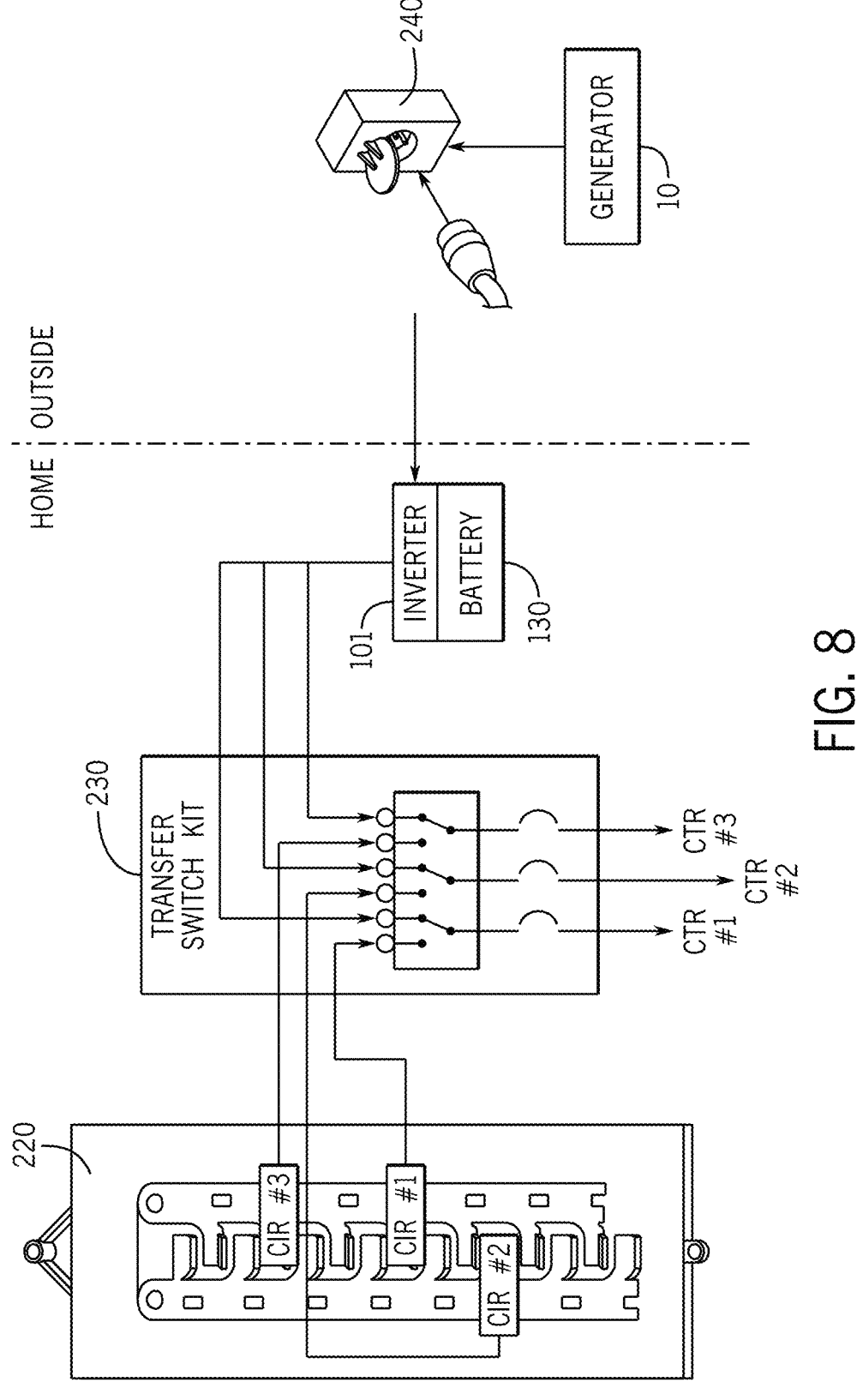
FIG. 8 illustrates an example transfer switch for the example home layout for the portable generator.

In some examples, as shown by FIGS. 7 and 8 the inverter module 101 is connected to the electrical panel 220 and/or the home or building circuits via a transfer switch 230. FIG. 7 illustrates an example home layout for the portable generator 10. FIG. 8 illustrates an example transfer switch 230 for the example home layout for the portable generator. The transfer switch 230 may include a detection circuit configured to detect that the inverter module 101 has been connected to the transfer switch 230 and/or that the utility has been disconnected or lost service. In response to the detection, the transfer switch 230 may switch power from being supplied by the home breaker circuit 220 to the invertor module 101 for a predetermined set of circuits. The predetermined set of circuits may include essential circuits (e.g., refrigeration, lights, medical equipment, etc.). The transfer switch 230 may include Silicon-controlled rectifiers (SCRs) to transfer the load of the predetermined set of circuits.

Figure 9:
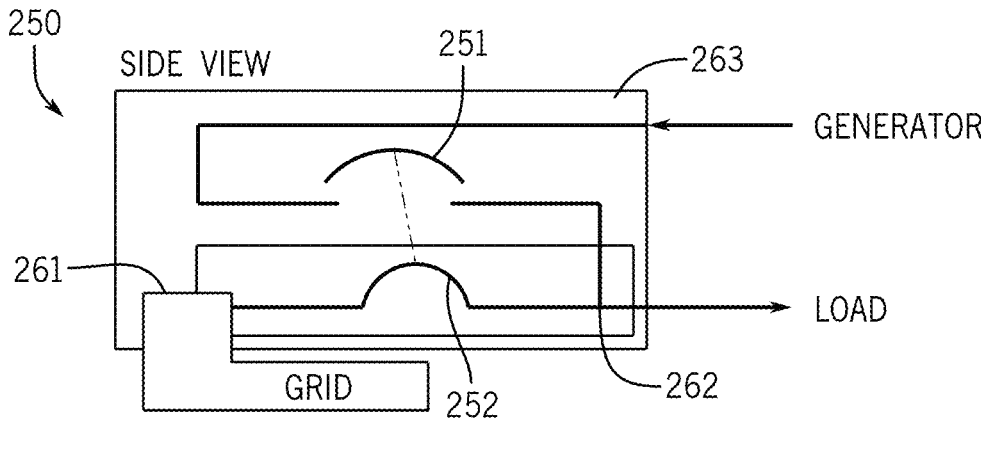
FIG. 9 illustrates an example circuit breaker transfer switch.
Figure 10:
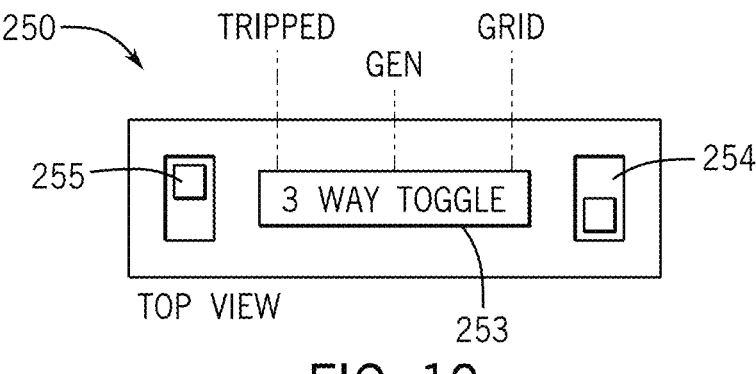
FIG. 10 illustrates example positions and indicators for the circuit breaker transfer switch.
Figure 11:
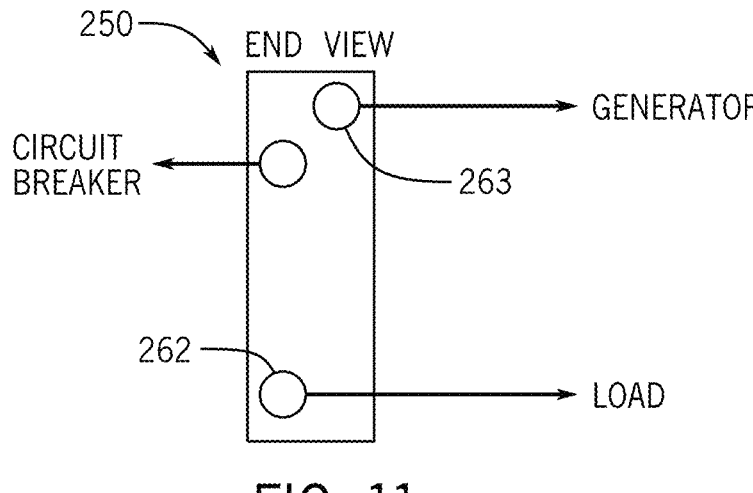
FIG. 11 illustrates example connections for the circuit breaker transfer switch.

In some examples, as shown by FIGS. 9-11, the invertor module 101 is connected directed to the electrical panel 220 using a generator circuit breaker with integrated transfer switch.

FIG. 9 illustrates an example circuit breaker transfer switch 250. The circuit breaker transfer switch 250 includes a selectable switch 251 and a current limiting switch 252. The current limiting switch 252 is connected to the grid circuit and the load circuit.

The circuit breaker transfer switch 250 includes a first connection point 261, a second connection point 262, and a third connection point 263. The first connection point 261 is electrically connected to a grid circuit. The second connection point 262 is electrically connected to a load circuit. The third connection point 263 is electrically connected to a generator circuit.

FIG. 10 illustrates example positions and indicators for the circuit breaker transfer switch 250. FIG. 11 illustrates example connections for the circuit breaker transfer switch 250 in a side view of the circuit breaker transfer switch 250.

The selectable switch 251 is connected to the load circuit and the generator circuit. The selectable switch 251 is configured for three positions including a first position in which the current limiting switch 252 is closed and the selectable switch 251 is open, a second position in which the current limiting switch 252 is open and the selectable switch 251 is closed, and a third position in which the current limiting switch 252 is open and the selectable switch 251 is open. The first position corresponds to utility operation, labeled "Grid" in FIG. 10. The second position corresponds to generator operation, labeled "Gen" in FIG. 10. The third position corresponds to an over current condition, labeled "Tripped" in FIG. 10, in the home or building circuit.

The circuit breaker transfer switch 250 includes at least one indicator including a first status for the current limiting switch 252 and a second status for the selectable switch 251.

The circuit breaker transfer switch 250 includes a connection outlet electrically connected to the third connection point and configured to receive a generator module, as described herein.

Figure 12:
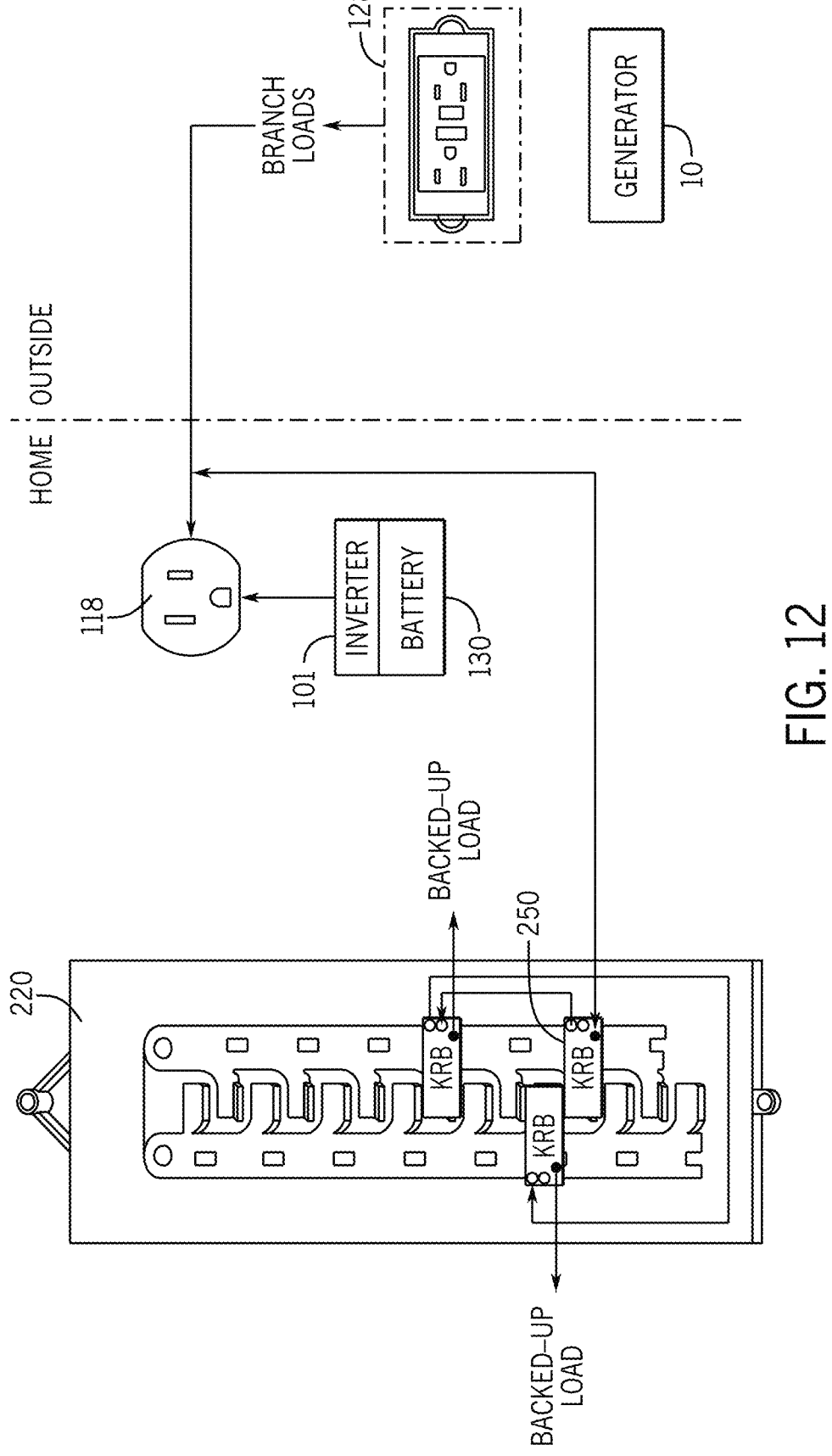
FIG. 12 illustrates an example circuit for the portable generator and the circuit breaker transfer switch in a first configuration.
Figure 13:
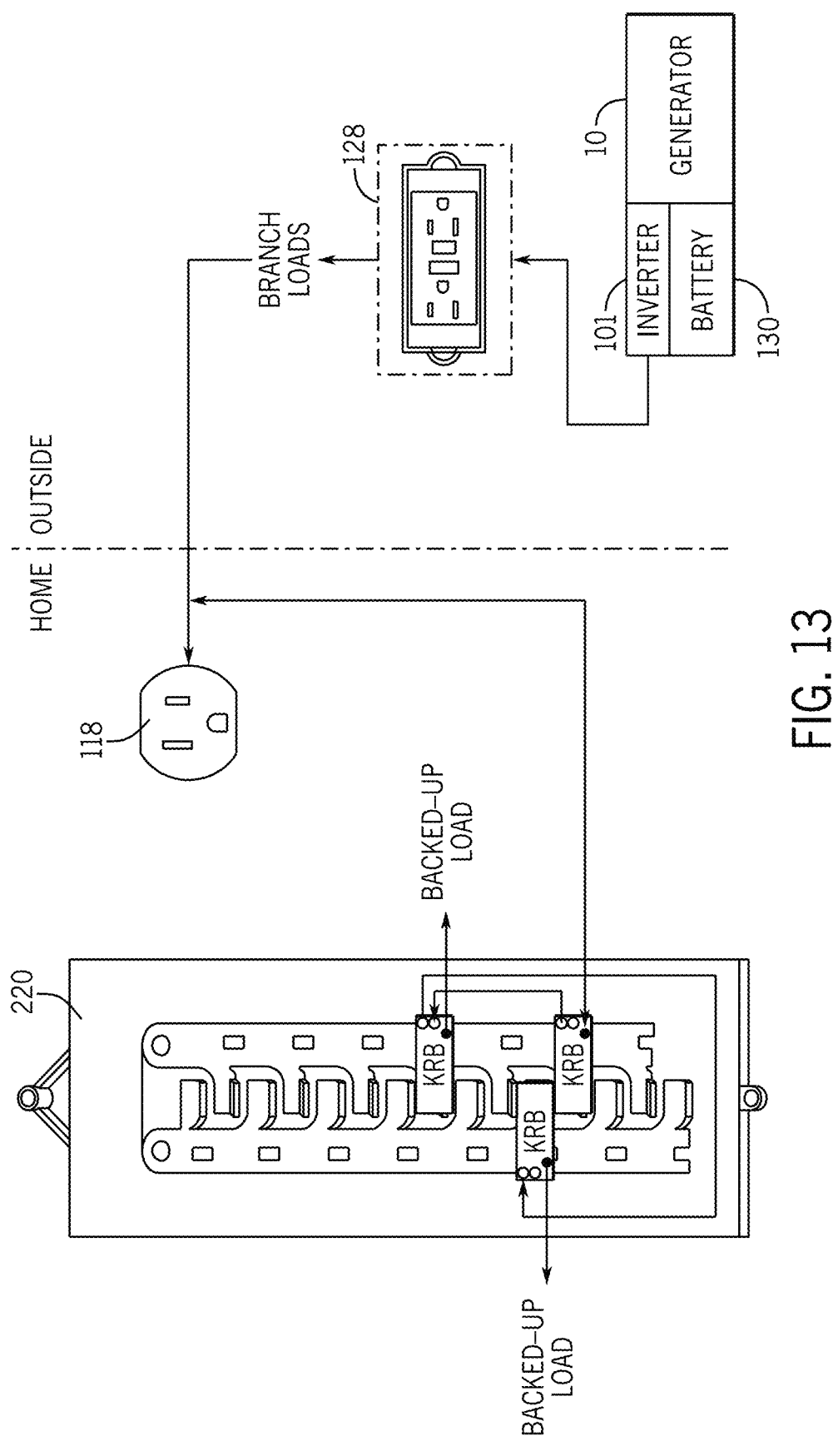
FIG. 13 illustrates an example circuit for the portable generator and the circuit breaker transfer switch in a second configuration.
Figure 14:
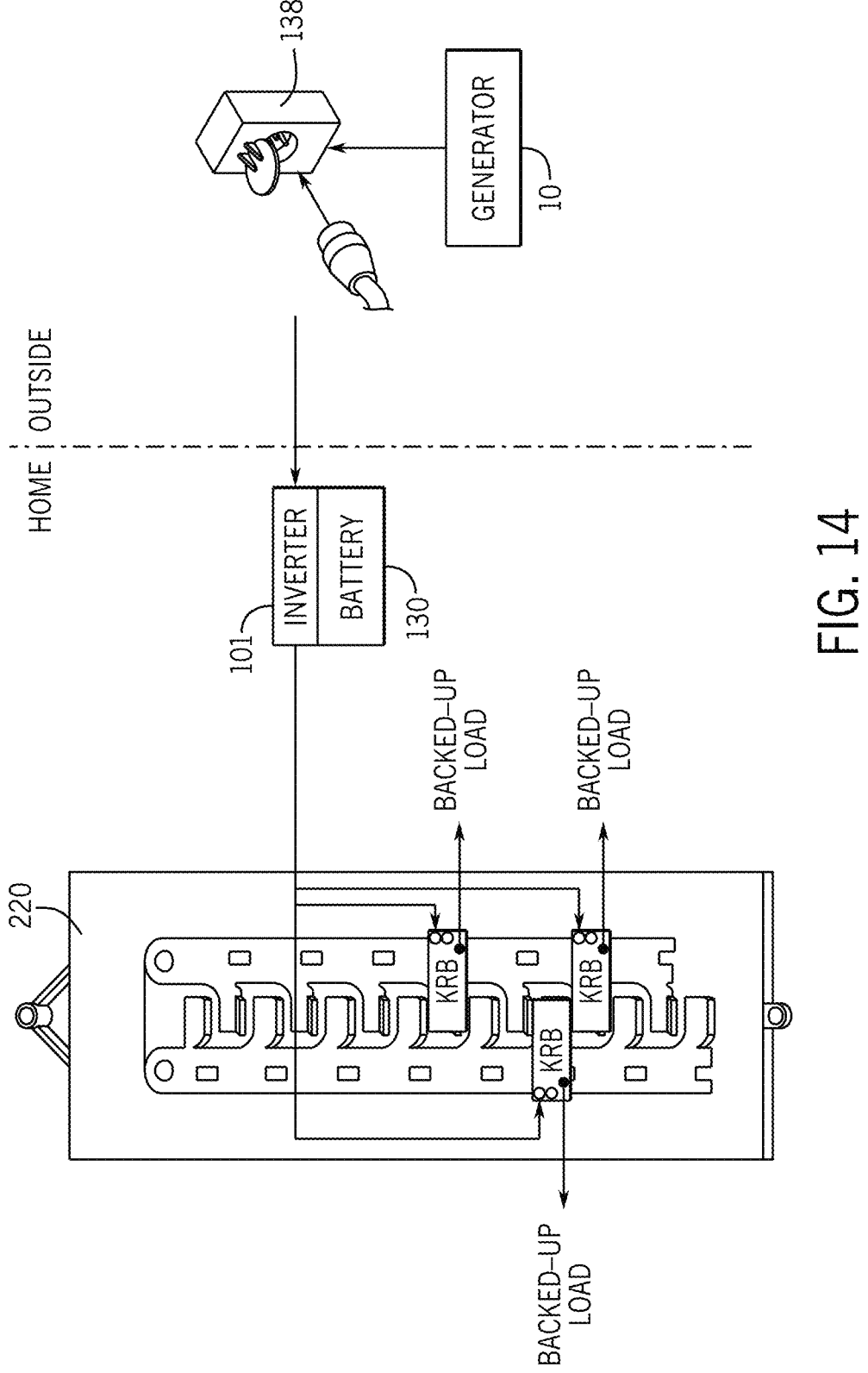
FIG. 14 illustrates an example circuit for the portable generator and the circuit breaker transfer switch in a third configuration.

FIGS. 12-14 illustrate the portable generator in various configurations that correspond to various modes of operation.

FIG. 12 illustrates an example circuit for the portable generator and the circuit breaker transfer switch 250 in a first configuration. In the first configuration, the inverter module 101 is connected to an indoor circuit outlet 118 for the circuit within the home or building. The circuit may have a corresponding circuit breaker transfer switch 250 within the panel 220. The inverter module provides backup power to the indoor circuit outlet 118 and corresponding circuit, which may occur when the generator 10 is disconnected.

FIG. 13 illustrates an example circuit for the portable generator and the circuit breaker transfer switch in a second configuration. In the second configuration, the inverter module 101 is connected to the generator 10. The inverter module 101 may be connected to outdoor circuit outlet 128, which is connected to the same circuit within the home or the building as the indoor circuit outlet 118. The inverter module provides backup power to the outdoor circuit outlet 128 and corresponding circuit.

FIG. 14 illustrates an example circuit for the portable generator and the circuit breaker transfer switch 250 in a third configuration. In the third configuration, the generator 10 is connectable to a secondary outlet 138. The secondary outlet 138 may have a different size or shape than standard outlets. The secondary outlet 138 is coupled to the same indoor circuit that the inverter module 101 is connected to within the home or building. Therefore, the generator 10 may charge the battery 130 even when the inverter module 101 is mounted to the wall. In addition, the generator 10 and inverter module 101 may operate in the hybrid mode of operation, such that the circuit is provided with the sum of the output of the battery 130 and the generator, even with the generator located outside of the home or building and the inverter module located within the home or building.

Figure 15:
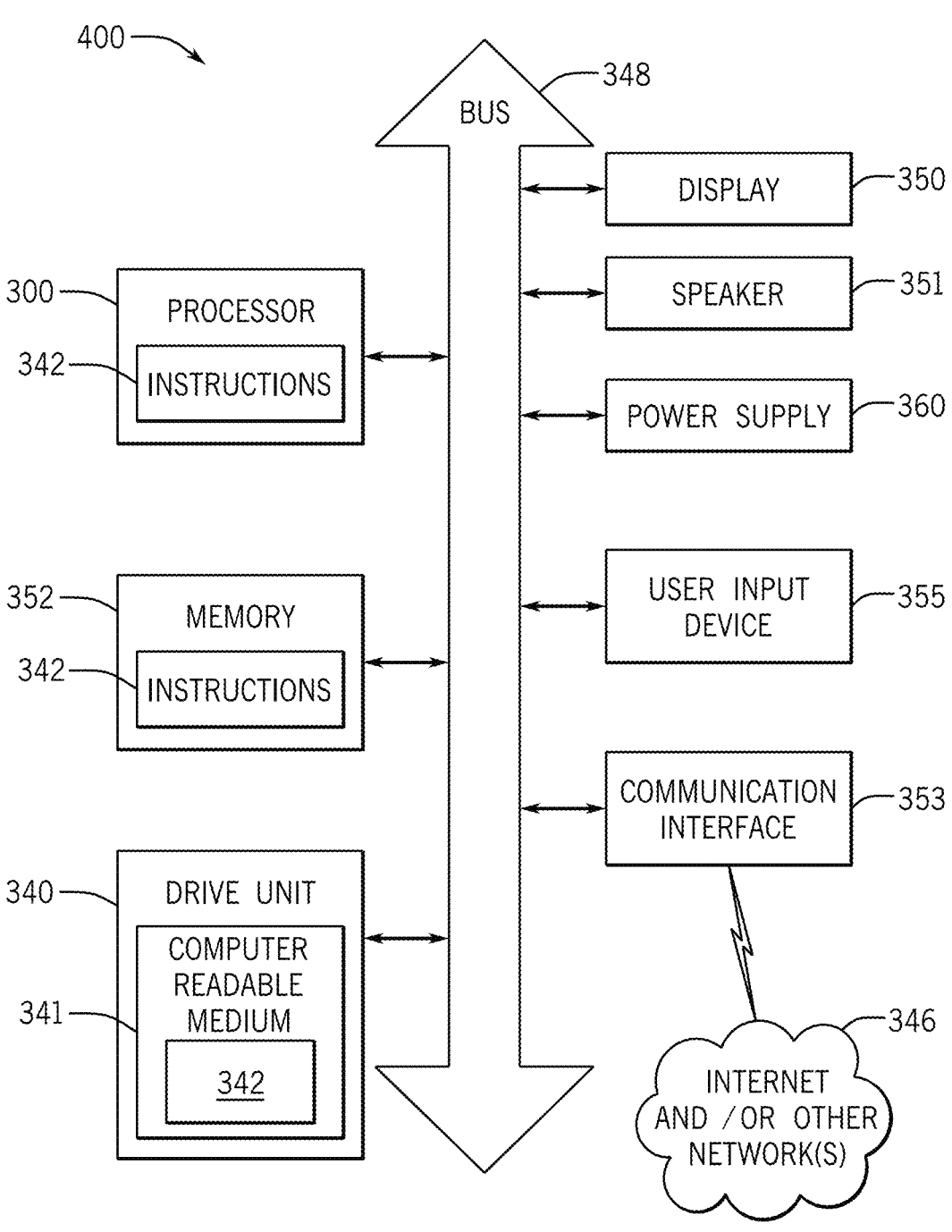
FIG. 15 illustrates a controller for the portable generator.

FIG. 15 illustrates an example controller 400 for the portable generator system. The controller 400 may include a processor 300, a memory 352, and a communication interface 353 for interfacing with devices or to the internet and/or other networks 346. In addition to the communication interface 353. The components of the control system 400 may communicate using bus 348.

Optionally, the control system 400 may include an input device 355 and/or a sensing circuit. The input device 355 may include the circuit breaker transfer switch 250, a touchscreen coupled to or integrated with the circuit breaker transfer switch 250, a keyboard, a microphone for voice inputs, a camera for gesture inputs, and/or another mechanism.

Optionally, the control system 400 may include a drive unit 340 for receiving and reading non-transitory computer media 341 having instructions 342. Additional, different, or fewer components may be included. The processor 300 is configured to perform instructions 342 stored in memory 352 for executing the algorithms described herein. A display 350 may couple with the circuit breaker transfer switch 250. The display 350 may be implemented via a mobile device such as a tablet or smartphone. The display 350 may be combined with the user input device 355.

Figure 16:
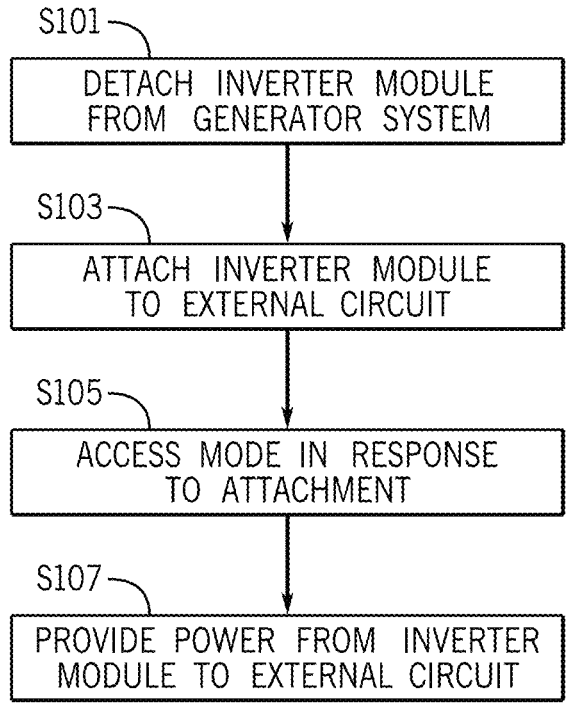
FIG. 16 illustrates a flow chart for the controller of FIG. 15.

FIG. 16 illustrates a flow chart for the control system 400 for the operation of the portable generator system. The acts of the flow chart may be performed by any combination of the control system 400, the network device or the server. Portions of one or more acts may be performed by the appliance. Additional, different of fewer acts may be included.

At act S101, the portable inverter module 101 is detached from the engine/generator. The engine/generator may be a portable generator (e.g., on wheels). The portable inverter module 101 may include an electrical connection to the engine/generator that provides electrical power from the engine/generator to the portable inverter module 101. The portable inverter module 101 may include a first mechanical coupler that physically connects the portable inverter module 101 to the engine/generator. The first mechanical coupler may align the portable inverter module 101 may align the portable inverter module 101 and the engine/generator at a predetermined position so that the electrical connection is made. In order to detach the portable inverter module 101, a latch, lever, or button may be depressed in order to decouple the first mechanical coupler.

At act S103, the portable inverter module 101 is attached to the wall mount and/or the external circuit via a second mechanical coupler. The portable inverter module 101 may be moved by the user (e.g., carried, lifted, etc.) from a first location of the engine/generator to a second location of the wall mount and/or external circuit. In some examples, the engine/generator is outdoors and the wall mount and/or external circuit is indoors.

At act S105, the controller 400 (e.g., through processor 300) accesses a predetermined mode in response to the attachment of the inverter module to the wall mount and/or the external circuit. The predetermined mode may be a battery mode where one or more loads on the external circuit are provided power from the battery of the inverter module. At act S107, power is provided to the external circuit from the battery.

Processor 300 may be a general purpose or specific purpose processor, an application specific integrated circuit (ASIC), one or more programmable logic controllers (PLCs), one or more field programmable gate arrays (FP-GAs), a group of processing components, or other suitable processing components. Processor 300 is configured to execute computer code or instructions stored in memory 352 or received from other computer readable media (e.g., embedded flash memory, local hard disk storage, local ROM, network storage, a remote server, etc.). The processor 300 may be a single device or combinations of devices, such as associated with a network, distributed processing, or cloud computing.

Memory 352 may include one or more devices (e.g., memory units, memory devices, storage devices, etc.) for storing data and/or computer code for completing and/or facilitating the various processes described in the present disclosure. Memory 352 may include random access memory (RAM), read-only memory (ROM), hard drive storage, temporary storage, non-volatile memory, flash memory, optical memory, or any other suitable memory for storing software objects and/or computer instructions.

The communication interface 353 may be connected to a network. The network may include wired networks (e.g., Ethernet), wireless networks, or combinations thereof. The wireless network may be a cellular telephone network, an 802.11, 802.16, 802.20, or WiMax network, a Bluetooth pairing of devices, or a Bluetooth mesh network. Further, the network may be a public network, such as the Internet, a private network, such as an intranet, or combinations thereof, and may utilize a variety of networking protocols now available or later developed including, but not limited to TCP/IP based networking protocols.

While the computer-readable medium (e.g., memory 352) is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored. The computer-readable medium may be non-transitory, which includes all tangible computer-readable media.

What is claimed is:

1. A generator module comprising:
a battery;
a charging circuit coupled to an output of a generator and configured to charge the battery;
an electric power outlet configured to provide an output from the battery, the generator, or a combination of the battery and the generator; and
an enclosure including the battery, the charging circuit, and the electric power outlet, the enclosure detachable from and re-attachable to the generator via a user-actuated mechanical coupling device.

2. The generator module of claim 1, wherein:
the mechanical coupling device is configured to (i) detach and re-attach the generator module to the generator in a first configuration, and (ii) detach and re-attach the generator module to an external circuit in a second configuration.

3. The generator module of claim 2, wherein the mechanical coupling device includes a first latch configured to secure the enclosure to the generator and a second latch configured to secure the enclosure to a mount.

4. The generator module of claim 3, wherein the mount is a wall mount.

5. The generator module of claim 2, wherein the mechanical coupling device includes a first electrical contact configured to electrically connect the generator to the battery and a second electrical contact configured to electrically connect the battery to the external circuit.

6. The generator module of claim 1, further comprising:
an inverter configured to convert electrical power stored in the battery to an alternating current signal for the electric power outlet.

7. The generator module of claim 6, further comprising:
a controller configured to select a mode for the generator module.

8. The generator module of claim 7, wherein the mode includes a quiet mode in which operation of the generator is minimized.

9. The generator module of claim 7, wherein the mode includes a maximum power mode in which the battery and the generator provide power to the electric power outlet.

10. The generator module of claim 7, wherein the mode includes a no-generator mode in which operation of the generator is prevented.

11. The generator module of claim 7, wherein the mode includes a hybrid mode in which the generated is operated during a predetermined load condition.

12. The generator module of claim 7, further comprising:
a sensing circuit configured to detect a load on the generator.

13. The generator module of claim 7, further comprising:
a battery level indicator in communication with the controller.

14. A method comprising:
detaching an inverter module from a portable generator, the inverter module comprising a battery, a charging circuit, and an electrical power outlet, the inverter module detachable from and re-attachable to the portable generator via a user-actuated mechanical coupling device;
attaching the inverter module to an external circuit; and
providing power to the external circuit from the battery.

15. The generator module of claim 7, wherein the mechanical coupling device comprises at least one of a latch, a bolt, a pin, a buckle, a latch, a lever, or a button.

16. The method of claim 14, further comprising determining a predetermined mode of operation in response to the attachment of the inverter module to the external circuit.

17. The method of claim 14, wherein the mechanical coupling device is configured to (i) detach and re-attach the inverter module to the portable generator in a first configuration, and (ii) detach and re-attach the inverter module to the external circuit in a second configuration.

18. The method of claim 17, wherein the mechanical coupling device includes a first latch configured to secure the inverter module to the portable generator and a second latch configured to secure the inverter module to a mount.

19. The method of claim 14, wherein the mechanical coupling device comprises at least one of a latch, a bolt, a pin, a buckle, a latch, a lever, or a button.

* * * * *